United States Patent
Zhang

(10) Patent No.: US 7,778,637 B2
(45) Date of Patent: Aug. 17, 2010

(54) METHOD FOR USER TERMINAL ACCESSING HOME NETWORK QUICKLY IN WIRELESS LOCAL AREA NETWORK

(75) Inventor: Wenlin Zhang, Guangdong (CN)

(73) Assignee: Huawei Technologies Co., Ltd., Shenzhen (CN)

(*) Notice: Subject to any disclaimer, the term of this patent is extended or adjusted under 35 U.S.C. 154(b) by 927 days.

(21) Appl. No.: 11/262,510

(22) Filed: Oct. 28, 2005

(65) Prior Publication Data

US 2006/0111107 A1 May 25, 2006

Related U.S. Application Data

(63) Continuation of application No. PCT/CN2004/000942, filed on Aug. 13, 2004.

(30) Foreign Application Priority Data

Aug. 14, 2003 (CN) ................. 03 1 53290

(51) Int. Cl.
*H04W 4/00* (2009.01)
(52) U.S. Cl. .............. 455/432.1; 455/435.2; 455/435.3; 455/426.1
(58) Field of Classification Search .............. 455/432.1, 455/432.3, 435.2, 435.3, 436; 370/332, 338
See application file for complete search history.

(56) References Cited

U.S. PATENT DOCUMENTS 5,590,397 A * 12/1996 Kojima ................. 455/417

(Continued)

FOREIGN PATENT DOCUMENTS

JP 11205342 7/1999

(Continued)

OTHER PUBLICATIONS

3GPP: "3rd Generation Partnership Project; Technical Specification Group Services and System Aspects; 3GPP System to Wireless Local Area Network (WLAN) Internetworking; System Description (Release 6)"; Draft 3GPP TS 23.234 V1.10.0; May 2003; pp. 1-77; XP002264842.

(Continued)

*Primary Examiner*—Duc M Nguyen

(57) ABSTRACT

The present invention discloses a method for a user terminal in a Wireless Local Area Network (WLAN) quickly accessing its home network. Pre-store in each user terminal, respectively, the identifications of all the WLANs with direct connections to the home network of the corresponding user terminal. For a user terminal that is in an area covered by more than one WLAN, compare the identification of each of the detected WLANs with the WLAN identifications stored in the current user terminal. A successful matching between the identification of a detected WLAN and a pre-stored WLAN identification then means that the home network of the current user terminal is connected with the corresponding WLAN access network and can be accessed via this WLAN. If a plurality of detected WLAN identifications match the stored identifications, select in accordance with a pre-defined selecting rule one of the corresponding WLANs and get accessed via the selected WLAN. This method enables a user terminal covered by more than one WLAN to find quickly a WLAN access network directly connected with its home network and to access the home network via this WLAN.

18 Claims, 6 Drawing Sheets

U.S. PATENT DOCUMENTS

| | | | |
|---|---|---|---|
| 6,144,855 A * | 11/2000 | Slovin | 455/432.1 |
| 6,626,451 B1 * | 9/2003 | Song | 280/642 |
| 7,020,439 B2 * | 3/2006 | Sinivaara et al. | 455/41.2 |
| 7,146,130 B2 * | 12/2006 | Hsu et al. | 455/3.04 |
| 7,184,768 B2 * | 2/2007 | Hind et al. | 455/435.3 |
| 7,542,451 B2 * | 6/2009 | Cooper et al. | 370/335 |
| 7,610,014 B2 * | 10/2009 | Buckley | 455/41.2 |
| 2001/0024953 A1 * | 9/2001 | Balogh | 455/432 |
| 2003/0119481 A1 * | 6/2003 | Haverinen et al. | 455/411 |
| 2004/0066756 A1 * | 4/2004 | Ahmavaara et al. | 370/328 |
| 2005/0094593 A1 * | 5/2005 | Buckley | 370/328 |
| 2005/0148299 A1 * | 7/2005 | Buckley | 455/41.2 |
| 2005/0254469 A1 * | 11/2005 | Verma et al. | 370/338 |
| 2006/0111082 A1 * | 5/2006 | Zhang | 455/411 |

FOREIGN PATENT DOCUMENTS

| | | |
|---|---|---|
| WO | 01/78246 A1 | 10/2001 |
| WO | WO 01/93523 A2 | 12/2001 |
| WO | WO 03037023 A1 | 5/2003 |

OTHER PUBLICATIONS

Zhang Peng, et al.; "Network selection in WLAN-3GPP interworking system"; Vehicular Technology Conference; 2004; VTC2004-Fall; 2004 IEEE 60th Los Angeles, CA, USA; Sep. 26-29, 2004; Piscataway, NJ; USA; IEEE; Sep. 26, 2004; pp. 4947-4950; XP010790357; ISBN: 0-7803-8521-7.

Nokia: "PLMN Selection for 802.11 type of WLAN; TDoc S2-031430 of 3GPP TSG-SA2 Meeting 31"; eGPP TSG SA2 #31; Apr. 7, 2003; XP002320251.

Research in Motion et al.; "WLAN Network Selection; TDoc S2-031860 of eGPP TSG-SA2 Meeting 32"; 3GPP TSG-SA2 Meeting #32; May 12, 2002; pp. 1-4; XP002320250.

* cited by examiner

METHOD FOR USER TERMINAL ACCESSING HOME NETWORK QUICKLY IN WIRELESS LOCAL AREA NETWORK

CROSS-REFERENCE TO RELATED APPLICATIONS

This application is a continuation of International Application No. PCT/CN2004/000942 filed on Aug. 13, 2004. This application claims the benefit of Chinese Patent Application No. 03153290. X filed on Aug. 14, 2003. The disclosures of the above applications are incorporated herein by reference.

FIELD OF THE INVENTION

The present invention relates to network accessing techniques, and particularly to a method for a user terminal accessing its home network quickly in a wireless local area network (WLAN).

BACKGROUND OF THE INVENTION

At users' demand for an increasingly high rate of wireless access, there emerges the WLAN, which is able to provide high-rate wireless data access in a relatively small area. Various techniques have been used in WLAN, among which a technical standard with more applications is IEEE 802.11b. This standard utilizes the frequency band of 2.4 GHz with a data transmission rate up to 11 Mbps. Other technical standards utilizing the same frequency band include IEEE 802.11g and the Bluetooth, where the data transmission rate of IEEE 802.11g is up to 54 Mbps. There are other new standards such as IEEE 802.11a and ETSI BRAN Hiperlan2 which use the frequency band of 5GHz with the transmission rate up to 54 Mbps as well.

Although there are various standards for wireless access, most WLANs are used for transferring IP data packets. The specific WLAN access standard adopted by a wireless IP network is usually transparent to the upper-level IP. Such a network is usually configured with Access Points for implementing wireless access of a user terminal and with controlling and connecting devices for implementing IP transmission.

Along with the rising and developing of WLAN, focus of research is shifting to the inter-working of WLAN with various wireless mobile communications networks, such as GSM, CDMA, WCDMA, TD-SCDMA, and CDMA2000. In accordance with the 3GPP standards, a user terminal is able to connect with Internet and Intranet as well as the home network and visited network of a 3GPP system via the WLAN access network. To be specific, when getting accessed locally, a WLAN user terminal will get connected with the 3GPP home network via the WLAN access network, as shown in FIG. 2; when roaming, it will get connected with the 3GPP visited network via the WLAN access network. Some entities of the 3GPP visited network are connected with corresponding entities of the 3GPP home network, for instance, the 3GPP Authentication, Authorization and Accounting (AAA) Proxy in the visited network is connected with the 3GPP AAA server in the home network, the WLAN Access Gateway (WAG) in the visited network is connected with the Packet Data Gateway (PDG) in the home network, as shown in FIG. 1. FIG. 1 and FIG. 2 are the schematic diagrams illustrating the networking architectures of a WLAN inter-working with a 3GPP system under roaming and non-roaming circumstances, respectively.

As shown in FIG. 1 and FIG. 2, a 3GPP system primarily comprises Home Subscriber Server (HSS)/Home Location Register (HLR), 3GPP AAA Server, 3GPP AAA Proxy, WAG, PDG, Charging Gateway (CGw)/Charging information Collecting Function (CCF), and Online Charging System (OCS). User terminals, WLAN access network, and all the entities of the 3GPP system together constitute a 3GPP-WLAN inter-working network, which can be regarded as a WLAN service system. In this service system, 3GPP AAA Server is in charge of the authentication, authorization, and accounting of a user, collecting the charging information sent from the WLAN access network and transferring the information to the charging system; PDG is in charge of transmission of user data from the WLAN access network to the 3GPP network or other packet data networks; and the charging system mainly receives and records the user's charging information transferred from the network while OCS instructs the network to transmit online charging information periodically in accordance with the expenses of the online charged users, makes statistics and conducts control.

Under non-roaming circumstances, when a WLAN user terminal desires to get accessed directly to the Internet/Intranet, the user terminal can access to Internet/Intranet via WLAN access network after it accomplishes authentication with AAA server (AS) via WLAN access network. Should the WLAN user terminal desire to get accessed to the service of 3GPP packet switched (PS) domain as well, it may further request the service of Scenario 3 (WLAN 3GPP IP Access) from the 3GPP home network. That is, the WLAN user terminal initiates a service authorization request for Scenario 3 (WLAN 3GPP IP Access) to the AS of the 3GPP home network, which will carry out service authentication and authorization for that request; if the authentication and authorization succeeds, AS will send an access accept message to the terminal and assign a corresponding PDG for the terminal. When a channel is established between the terminal and the assigned PDG, the terminal will be able to get accessed to the service of 3GPP PS domain. Meanwhile, the offline charging system and OCS records the charging information in accordance with the terminal's use of the network.

Under roaming circumstances, when a WLAN user terminal desires to get accessed directly to the Internet/Intranet, it may make a request to the 3GPP home network by way of the 3GPP visited network for access to the Internet/intranet. Should the user terminal also desire to request the service of Scenario 3 (WLAN 3GPP IP Access) to get accessed to the service of the 3GPP PS domain, the terminal needs to initiate via the 3GPP visited network a service authorization process at the 3GPP home network. The authorization is carried out likewise between the terminal and AS of the 3GPP home network. After the authorization succeeds, AS assigns the corresponding home PDG for the terminal, then the user terminal will be able to get accessed to the service of 3GPP PS domain of the home network after it establishes a channel with the assigned PDG via the WAG of the 3GPP visited network.

As shown in FIG. 3, in a 3GPP-WLAN inter-working network, if a WLAN is connected at the same time with a plurality of 3GPP visited networks, that is, a plurality of operating mobile communications networks (3GPP visited networks herein refer to Visited Public Land Mobile Networks (VPLMN)), it will be necessary for a WLAN user terminal to select a desired VPLMN to access after the terminal gets accessed to the WLAN. For instance, in China, a WLAN access network may be connected simultaneously with two operational VPLMN, China Mobile and China Unicom; then a user of China Unicom, after getting accessed via the WLAN, has to instruct the WLAN access network to get it accessed to the operational VPLMN of China Unicom. For another instance, a French user may roam to a WLAN in China, if the home network of the French user has roaming protocols with both China Mobile and China Unicom, then under the circumstances that the WLAN is connected with both China Mobile and China Unicom, the French user will need to select a VPLMN to get accessed after accessing the WLAN. At present, under the above circumstances, a WLAN user terminal informs the WLAN access network of the self-selected network through network-selecting information, where the network-selecting information is the information about the operational mobile communications network that the user terminal currently desires to access, which may be placed in a separately-defined field, or placed in the field of user identification defined in the format of network access identification (NAI).

However, if the current user terminal is under a network environment with a plurality of WLANs existing at the same time, solutions in the prior art can not ensure that the user terminal is able to select the best PLMN, typically the home network of that user terminal. Take as an example the network environment shown as FIG. 4, the WLAN user terminal is in the coverage of WLAN #1, WLAN #2, . . . , WLAN #n at the same time, where WLAN #1 is connected with visited networks of the current user terminal, VPLMN #1 and VPLMN #2, WLAN #2 is connected with the home network and a visited network of the current user terminal, HPLMN and VPLMN #3, . . . In this case, the best selection for the current user terminal is to get accessed to its home network HPLMN via WLAN #2. However, in accordance with the network-selecting solutions in the prior art, this user terminal may probably get accessed via WLAN #1 first while operational networks directly connected with WLAN #1 are all roaming networks of the user terminal, then the terminal will have no chance to select its own home network directly connected with WLAN #2.

Aimed at making a user terminal able to select the best network to access every time, a method of making query of WLAN access networks in turn has been put forward in another patent application: A user terminal that is covered by more than one WLAN may make query of each detected WLAN in turn with the preset initial network-selecting information; if the current WLAN access network is directly connected with the initially selected network, then get accessed to this initially selected network via the current WLAN access network; otherwise make query of the next WLAN in turn, and so on and so forth. Although this method ensures that the PLMN desired by the user, for example, HPLMN, is found as long as it exists, the approach of making query in turn results in slow accessing rate. So far there has been no specific solution put forward to how to make a user terminal, when it desires only to access its HPLMN, able to find, every time at the fastest rate, the WLAN connected with its home network and get accessed via this WLAN.

SUMMARY OF THE INVENTION

In view of the above, the primary object of this invention is to provide a method for a WLAN user terminal accessing its own home network quickly such that a user terminal covered by more than one WLAN is able to find the WLAN access network that is directly connected with the home network of the terminal and get accessed via this WLAN.

To attain the above object, the solution in accordance with this invention is as follows:

A method for user terminal accessing its home network, wherein the user terminal is covered by more than one Wireless Local Area Network (WLAN), the method includes:
 obtaining the identifications of detected WLANs;
 selecting an identification from the identifications of the detected WLANs;
 comparing the selected identification with a pre-stored identification of a WLAN directly connecting with the home network of the user terminal;
 accessing the home network of the user terminal via the WLAN identified by the selected identification that matches the pre-stored identification of the WLAN directly connecting with the home network of the user terminal.

The above solution further includes:
 recording the matched identification of the WLAN;
 selecting one WLAN from the matched WLANs in accordance with a pre-defined selecting rule if there are more than one matched WLAN;
 wherein said accessing the home network comprises:
 accessing the home network of the user terminal via the selected WLAN from the matched WLANs.

In the above solution, the said WLAN identification comprises the service set identification (SSID) of WLAN, and the said selecting rule comprises: selecting the WLAN access network for current use based on the signal intensity, or the network load, or the signal intensity and network load of all the WLANs matching the pre-stored WLAN identifications.

The method further comprises: setting up in advance in a user terminal a WLAN roaming relation list for use in storing the identification information of WLANs directly connecting with the home network of the user terminal, and the said comparing is: the user terminal comparing the detected WLAN identifications with the identification information of WLANs in the WLAN roaming relation list. In addition, priority information for use in selecting a WLAN is also stored in the said WLAN roaming relation list, then the said selecting rule comprises selecting the WLAN for current use in accordance with the pre-stored priority information.

The method further comprises: a user terminal updating whenever necessary or periodically the pre-stored identification information of WLANs, where the said updating comprises the network instructing the user terminal to make updating; or the network issuing directly to the user terminal the WLAN identification information related with that user terminal; or the user terminal initiatively making query in its own home network and updating the pre-stored WLAN identification information.

In accordance with the method provided by this invention, identifications of all the WLANs having direct connection with the home network of a user terminal are pre-stored in the said user terminal. Thus, when a user terminal is in an area covered by more than one WLAN, the identification of each detected WLAN access network is compared with the pre-stored identifications and the user terminal will get accessed via a matched WLAN. In this way, it is possible for a user terminal to get accessed to its own home network every time at the fastest speed when the WLAN user terminal is in an area covered by more than one WLAN, thereby providing better service to the users.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The essential idea of this invention is as follows: Pre-store, in each user terminal, respectively, the identifications of all the WLANs having direct connection with the home network of the user. For a user terminal that is in an area covered by more than one WLAN, compare each of the detected WLAN identifications with the pre-stored WLAN identifications of the current user terminal successively. If there is a successful matching, it means that the corresponding WLAN access network is connected with the home network of the current user terminal and via this WLAN the user terminal will access to its home network. If there are more than one WLAN that is able to match with the stored identifications, select one of them according to a pre-defined selecting rules to get accessed. The WLAN identification herein may comprise SSID.

Figure 1:
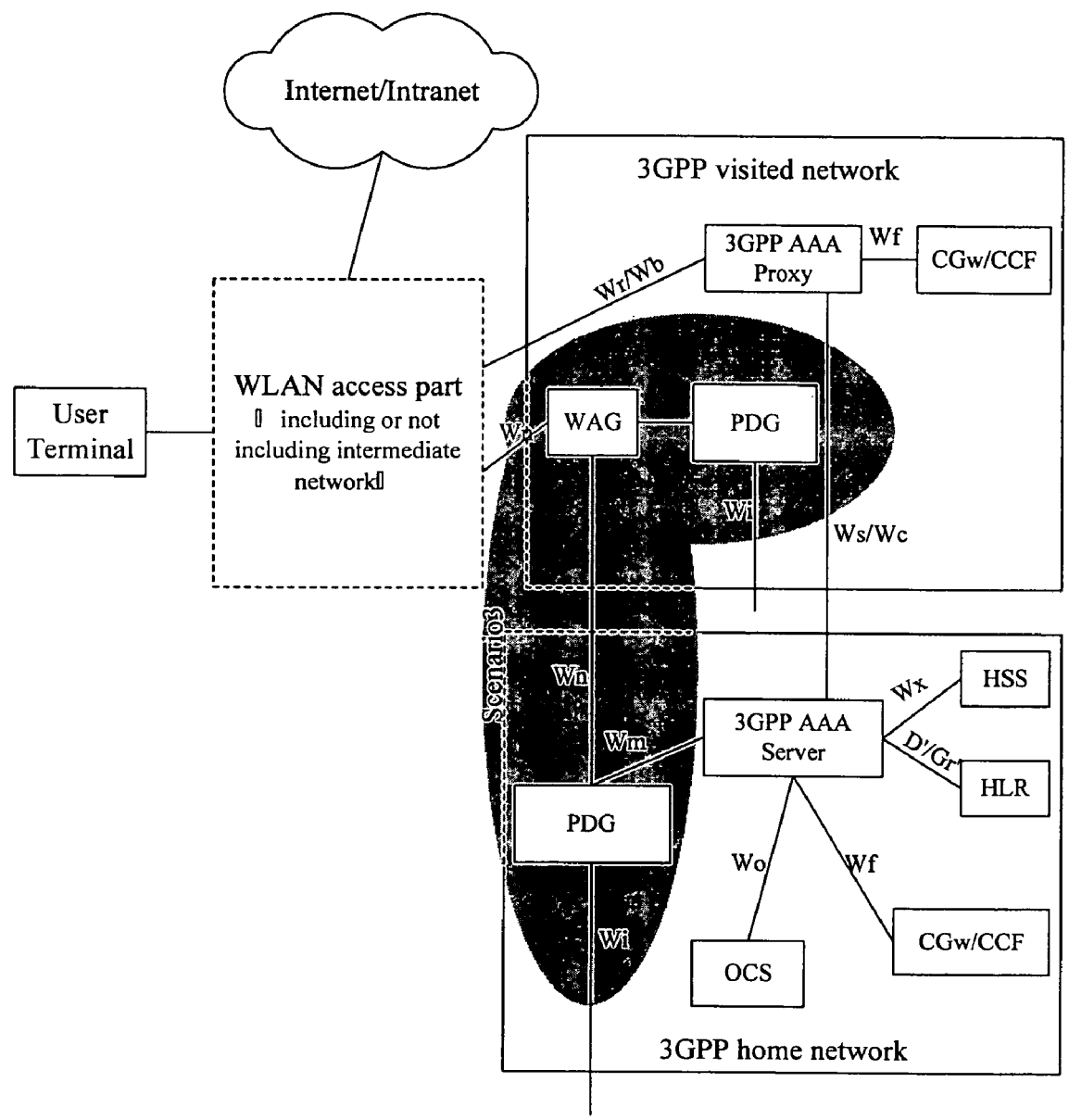
FIG. 1 is a schematic diagram illustrating the network architecture of inter-working WLAN and 3GPP system under roaming circumstances.
Figure 2:
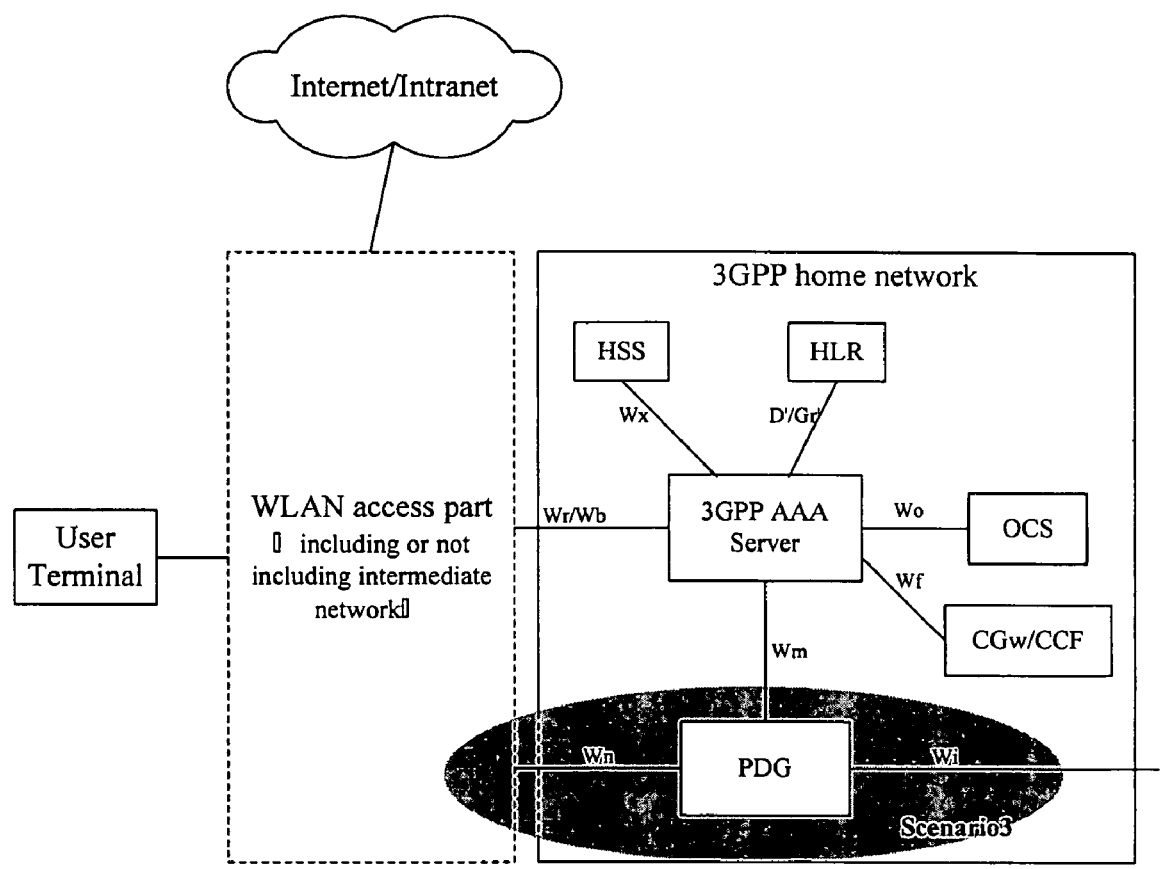
FIG. 2 is a schematic diagram illustrating the network architecture of inter-working WLAN and 3GPP system under non-roaming circumstances.
Figure 3:
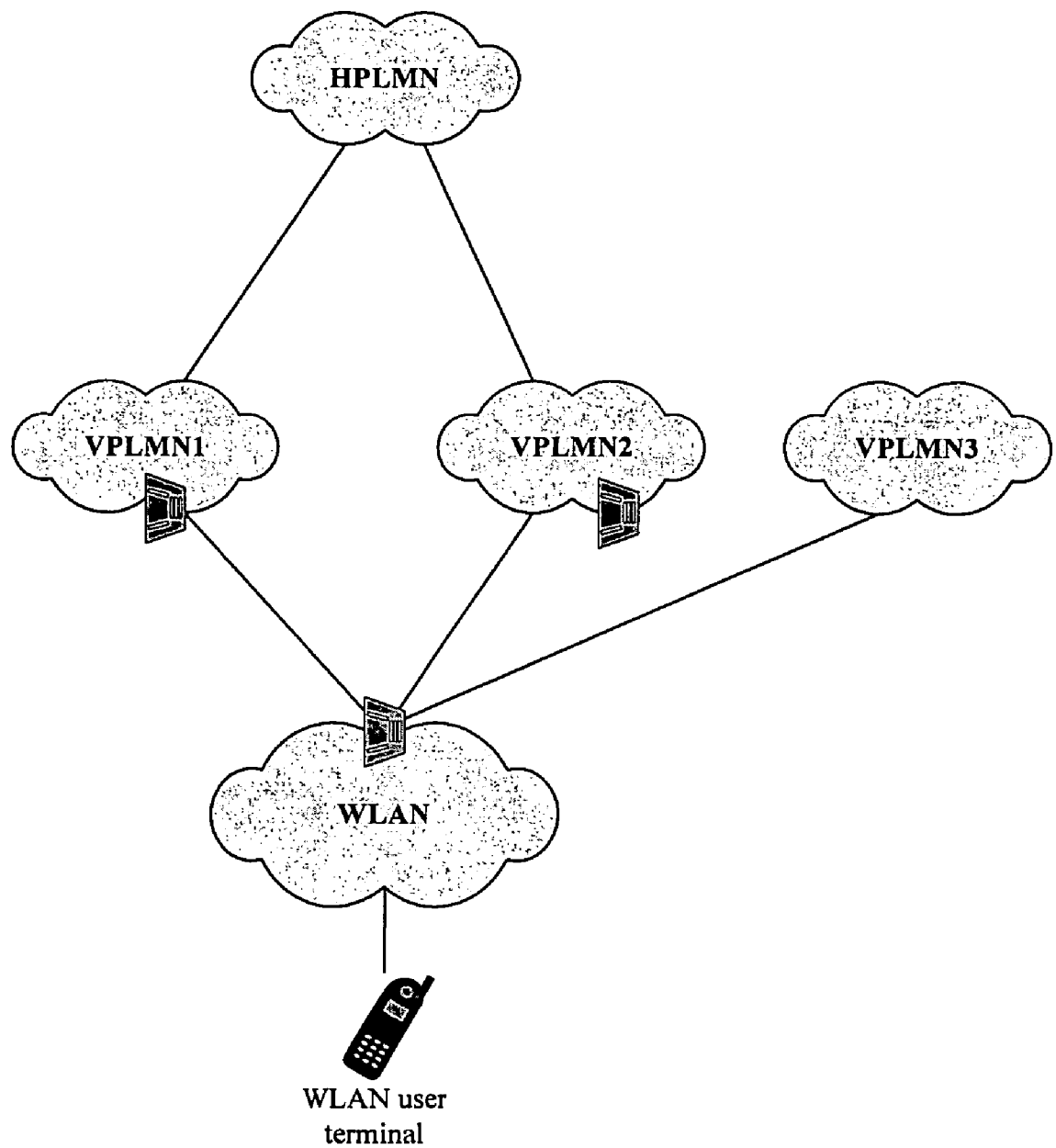
FIG. 3 is a schematic diagram illustrating the network architecture of WLAN connecting with a plurality of VPLMNs.
Figure 4:
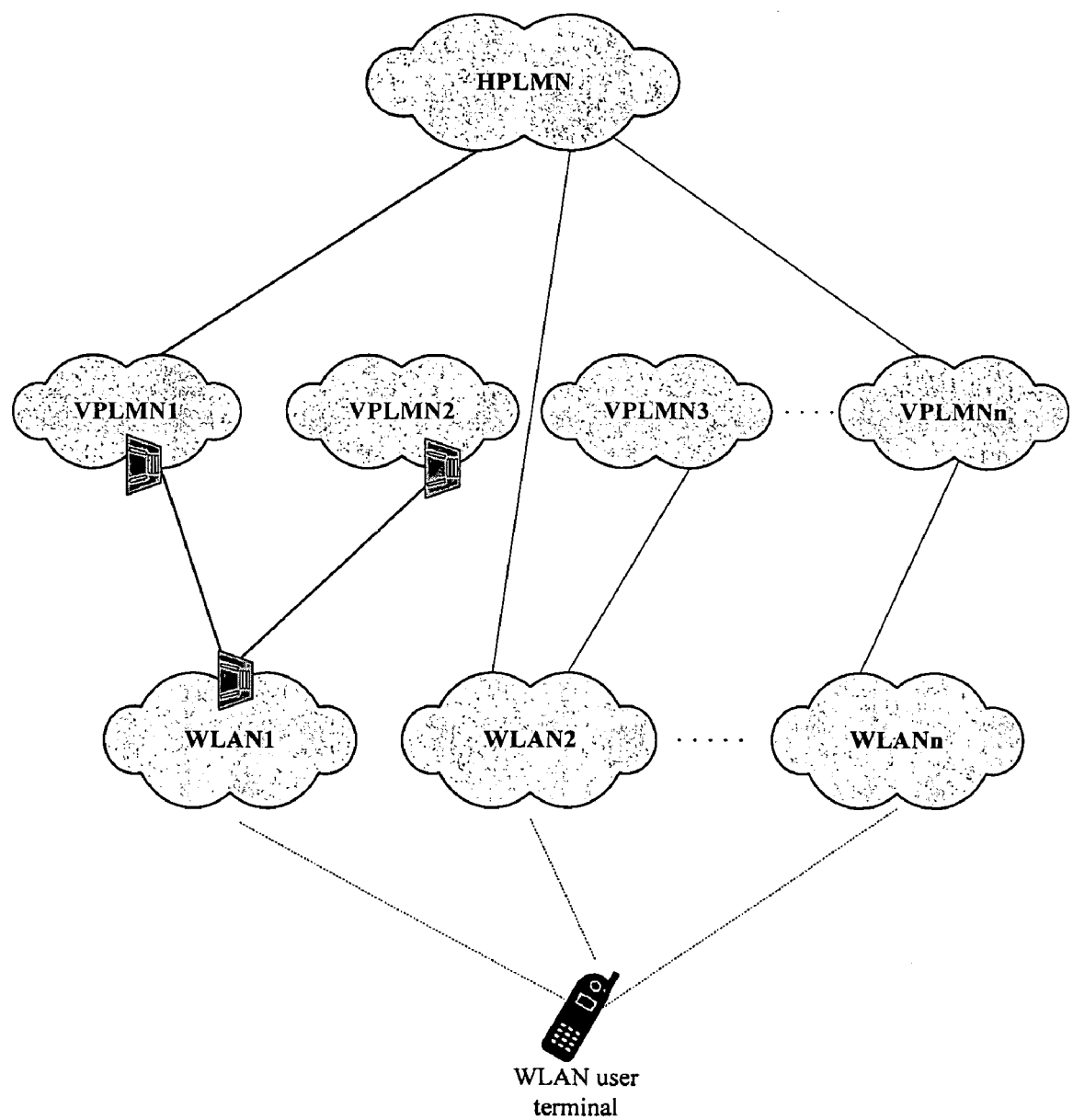
FIG. 4 is a schematic diagram illustrating the network architecture with the current user terminal in an area covered by a plurality of WLANs.
Figure 5:
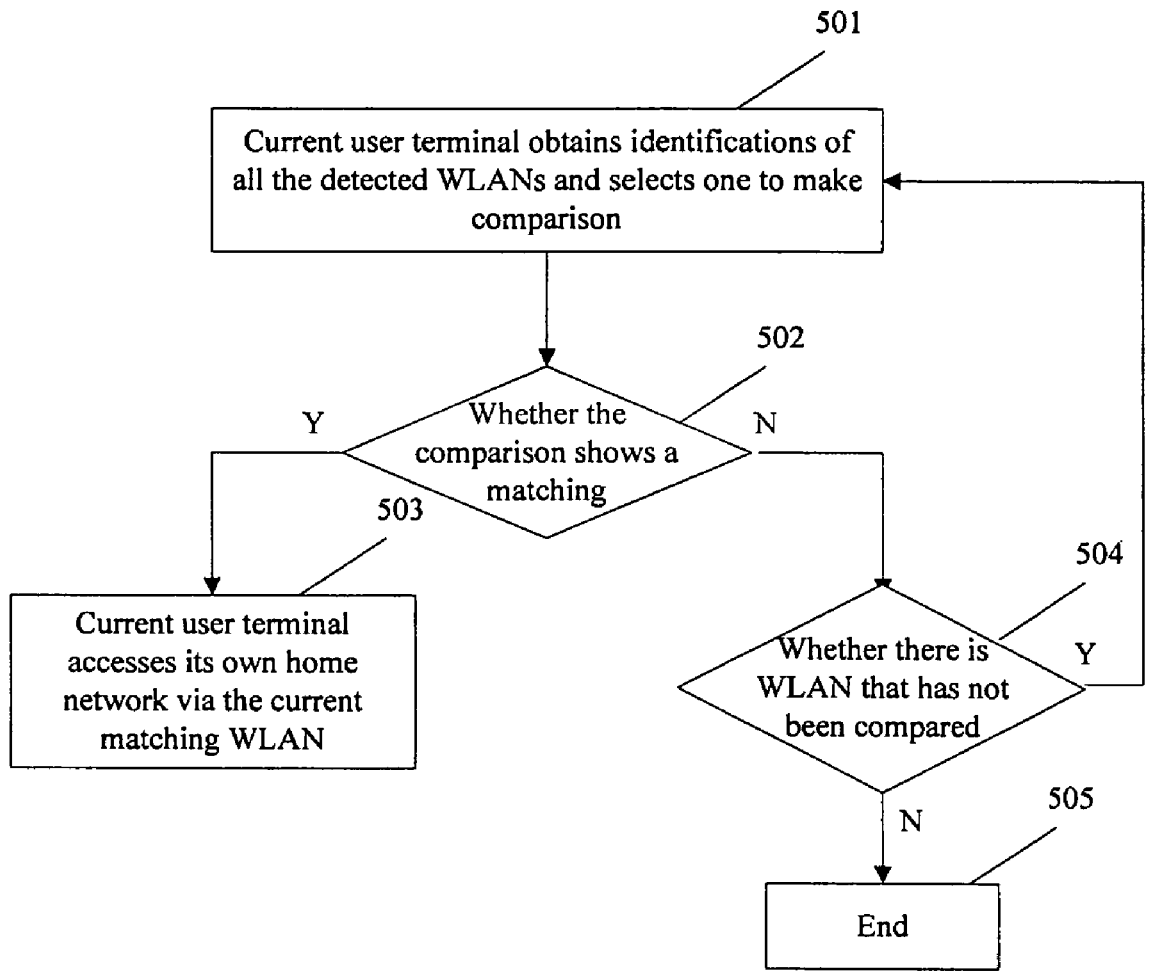
FIG. 5 is the implementing flowchart of this invention.

Based on the network architecture as shown in FIG. 4, every user terminal has the identifications of all the WLANs having direct connection with its own home network pre-stored in itself. When a WLAN user terminal is trying to access a 3GPP-WLAN inter-working network, the user terminal will detect a wireless access network and may find that there are more than one WLAN exist. Then the method for quickly accessing the home network of the current user terminal in accordance with this invention, as shown in FIG. 5, comprises the steps of:

Steps 501~503: The current user terminal obtains the identifications of all the currently detected WLANs, selects one from all identifications of the detected WLANs that have not been compared, and compares the identification of the selected WLAN with each of the pre-stored WLAN identifications. Decide whether the selected identification matches one of the pre-stored WLAN identifications, if yes, get accessed to the home network of the user terminal via the selected WLAN access network and end the current process; otherwise, go to step 504.

The said comparison herein is to look for a pre-stored WLAN identification that is identical with the identification of the currently selected WLAN. If it is found, it means a successful matching. The said getting accessed via the selected WLAN access network comprises: the current user terminal using the information of its home network as the network-selecting information and sending to the currently selected WLAN access network this information; and the said WLAN completing the subsequent accessing process after receiving the information.

In accordance with this invention, a WLAN roaming relation list may be configured in advance so as to save the identifications of all the WLANs that have direct connection with the home network of the current user terminal in this list and compare the identifications saved in this list when making comparison.

Steps 504~505: Decide whether there is a WLAN that has not been compared, if there is, return to step 501, otherwise, end the current process.

Figure 6:
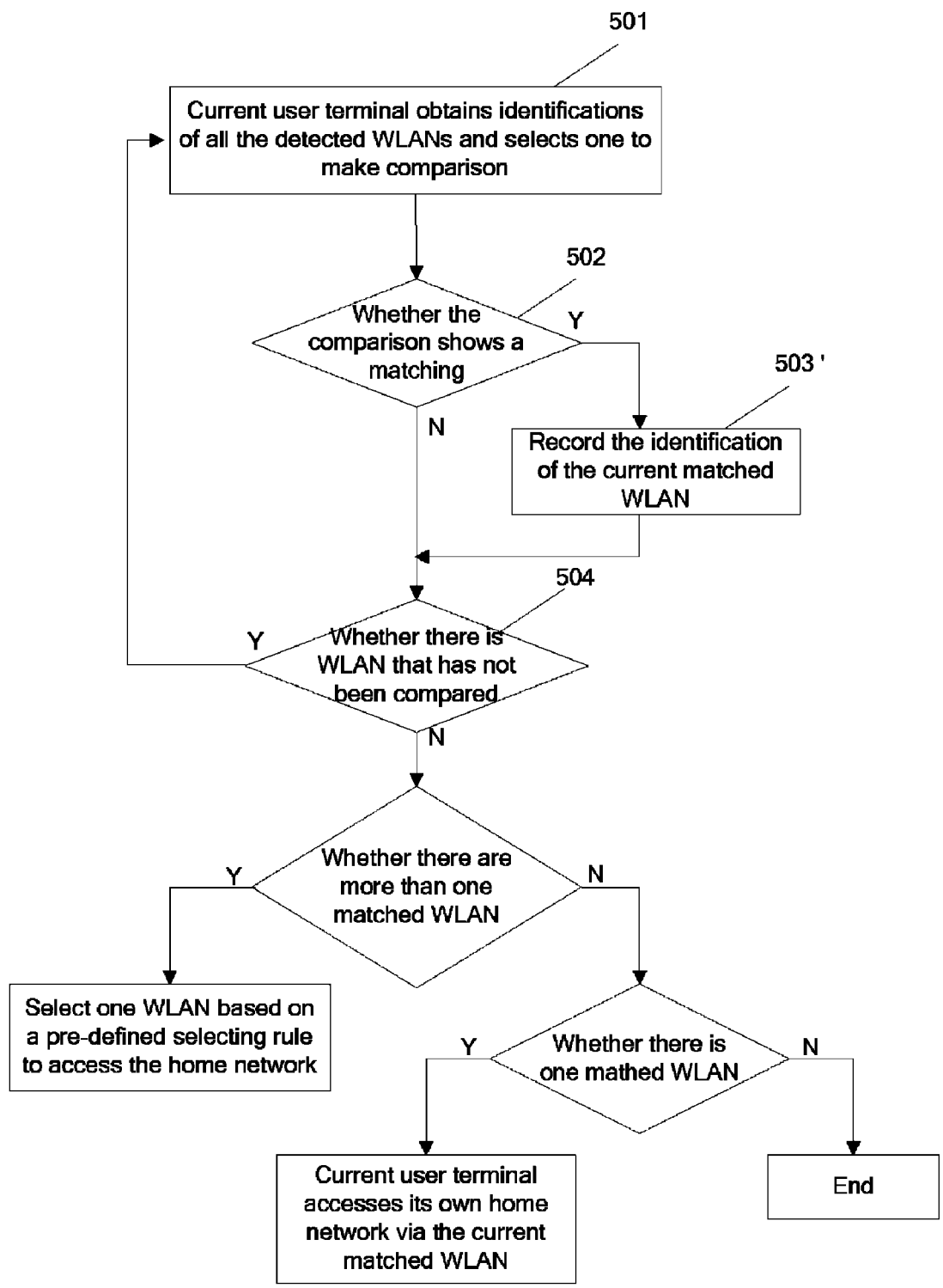
FIG. 6 is the implementing flowchart of an embodiment of this invention.

As shown in FIG. 6, in accordance with this invention, the user terminal may not necessarily get accessed in step 503. In this case, step 503 becomes step 503', at which the current identification of WLAN that is successfully matched is only recorded. Then continue with step 504. Furthermore, the current process may not necessarily end after all the identifications of detected WLANs have been compared, instead, it will be decided whether there is more than one successful matching, if not, it will be further decided whether there is one WLAN that is successfully matched, if there is, access to the home network of the current user terminal via the successfully matched WLAN; if there is not, end the current process. If there are more than one successfully matched WLAN, select one WLAN in accordance with a pre-defined selecting rule.

The said pre-defined selecting rule may comprise an arbitrary selection, a selection based on the signal quality and/or network load, a selection based on pre-defined priorities, or a selection by the user with all the recorded information of successful matching popping up for the user. The signal quality mentioned herein includes such information as signal intensity, stability of signal intensity, and etc.

Take pre-defining priority as an example, then a column of priority may be added to the configured WLAN roaming relation list, as shown in

TABLE 1

| WLAN identification | Priority |
|---|---|
| WLAN 3 | 3 |
| WLAN 6 | 1 |
| WLAN 8 | 2 |

If a WLAN roaming relation list as shown in Table 1 is stored in User Terminal A, showing that there are three WLANs directly connected with the home network of User Terminal A, when the current User Terminal A is in an area covered by WLAN1, WLAN3, WLAN 5, and WLAN 6, it will be found that WLAN3 and WLAN6 are matched after comparison. Then it is needed to decide which WLAN has a higher priority. Since it can be seen from Table 1 that WLAN3 has a higher priority than WLAN6, get accessed via WLAN3.

The identification information of WLAN stored in each user terminal may be updated whenever necessary or periodically, and the updating approaches include: the network instructing a user terminal to make updating, and the user terminal making query in the server provided by the home network and updating the pre-stored information; or the network issuing directly to each user terminal the WLAN identifications related to the user terminal, and after receiving the issued information, the user terminal deciding whether there is change, if yes, updating the stored information; or the user terminal making initiative query in the server provided by the home network, and if there is change, updating the pre-stored information. The home network of the user terminal herein needs to record in time the identifying information of the WLANs to which the home network's connecting relation has changed.

It is appreciated that the above description is a preferred embodiment of this invention and should not be construed as limits to the protection scope of this invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for a user terminal accessing a Home Public Land Mobile Network (HPLMN) of the user terminal via a Wireless Local Area Network (WLAN), the method comprises:
   obtaining identifications of WLANs detected by the user terminal, wherein the user terminal is covered by more than one WLAN, the more than one WLAN is interworking with a 3GPP system which comprises a plurality of Public Land Mobile Networks, one of the plurality of Public Land Mobile Networks functions as the HPLMN of the user terminal, and the other of the plurality of Public Land Mobile Networks function as Visited Public Land Mobile Networks (VPLMN) of the user terminal;
   selecting an identification from the identifications of the detected WLANs;
   comparing the selected identification with pre-stored identifications of the WLANs directly connecting with the HPLMN of the user terminal; and
   the user terminal accessing its HPLMN via the WLAN identified by the selected identification that matches the pre-stored identifications of the WLANs directly connecting with the HPLMN of the user terminal.

2. The method according to claim 1, further comprising:
   recording each selected identification that matches the pre-stored identification;
   selecting a first identification from the matched identifications in accordance with a pre-defined selecting rule if there are more than one matched identifications;
   wherein said accessing the HPLMN comprises:
   accessing the HPLMN of the user terminal via the WLAN corresponding to the first identification.

3. The method according to claim 2, wherein each of said identifications of the detected WLANs comprises a service set identification (SSID) of a detected WLAN corresponding to that identification.

4. The method according to claim 2, wherein the pre-defined selecting rule comprises: selecting a WLAN based on the signal intensity, or a network load, or a signal intensity and a network load of all WLANs.

5. The method according to claim 1, wherein each of said identifications of the detected WLANs comprises a service set identification (SSID) of a detected WLAN corresponding to that identification.

6. The method according to claim 1, further comprising:
   setting up in advance in the user terminal a WLAN roaming relation list configured to store the identification of the WLAN directly connecting with the HPLMN of the user terminal; and
   the user terminal comparing the selected identification with the pre-stored identification of a WLAN in the WLAN roaming relation list.

7. The method according to claim 6, wherein the WLAN roaming relation list further includes priority information for selecting a WLAN.

8. The method according to claim 7, wherein the pre-defined selecting rule comprises: selecting a WLAN in accordance with the priority information.

9. The method according to claim 2, further comprising:
   setting up in advance in the user terminal a WLAN roaming relation list configured to store the identification of the WLAN directly connecting with the HPLMN of the user terminal; and
   the user terminal comparing the selected WLAN identification with the pre-stored identification of a WLAN in the WLAN roaming relation list.

10. The method according to claim 9, wherein the WLAN roaming relation list further includes priority information for selecting a WLAN.

11. The method according to claim 10, wherein the selecting rule comprises: selecting a WLAN in accordance with the priority information.

12. The method according to claim 1, further comprising: the user terminal updating the pre-stored identification of a WLAN directly connecting with the HPLMN.

13. The method according to claim 12, wherein the updating comprises:
   a network instructing the user terminal to make updating, and the user terminal making query in the server provided by the HPLMN and updating the pre-stored information;
   receiving the identification of the WLAN directly connecting with the HPLMN of the user terminal from a network; or
   the user terminal making initiative query in the HPLMN and updating the pre-stored identification of the WLAN directly connecting with the HPLMN.

14. The method according to claim 12, further comprising: recording, by the HPLMN of the user terminal, in time the identifications of WLANs to which the HPLMN's connecting relations have changed.

15. The method according to claim 2, further comprising: the user terminal updating the pre-stored identifications of the WLAN directly connecting with the HPLMN periodically or whenever necessary.

16. The method according to claim 15, wherein the updating comprises:
   updating according to notification of a network; or
   receiving the identification of the WLAN directly connecting with the HPLMN of the user terminal from the network; or
   making query in the HPLMN and updating the pre-stored identification of the WLAN directly connecting with the HPLMN.

17. The method according to claim 1, further comprising:
   if the selected WLAN identification matches one of the one or more pre-stored WLAN identifications, initiating, by the user terminal, a service authorization request for a service of 3GPP packet switched domain to an Authentication, Authorization and Accounting Server (AS) of the HPLMN via the WLAN having the selected WLAN identification; and
   wherein the user terminal accessing its HPLMN via the WLAN identified by the selected identification comprises:
   if the authorization succeeds, getting accessed to, by the user terminal, the service of 3GPP packet switched domain of the HPLMN after a channel is established between the terminal and a Packet Data Gateway (PDG) assigned by the AS.

18. A user terminal comprising:

a module to obtain identifications of Wireless Local Area Networks (WLANs) detected by the user terminal, wherein the user terminal is covered by more than one WLAN, the more than one WLAN is inter-working with a 3GPP system which comprises a plurality of Public Land Mobile Networks, one of the plurality of Public Land Mobile Networks functions as Home Public Land Mobile Network (HPLMN) of the user terminal, and the other of the plurality of Public Land Mobile Networks function as Visited Public Land Mobile Networks (VPLMN) of the user terminal;

a module to select an identification from the identifications of the detected WLANs;

a module to compare the selected identification of the detected WLAN with pre-stored identifications of WLANs directly connecting with the HPLMN of the user terminal; and a module to access its HPLMN via the WLAN identified by the selected identification that matches the pre-stored identifications of the WLANs directly connecting with the HPLMN of the user terminal.

* * * * *